United States Patent
Lee et al.

(10) Patent No.: US 11,729,715 B2
(45) Date of Patent: *Aug. 15, 2023

(54) METHOD AND APPARATUS FOR ALLOCATING FLEXIBLE TRANSMISSION SLOT IN WIRELESS LAN SYSTEM

(71) Applicant: Electronics and Telecommunications Research Institute, Daejeon (KR)

(72) Inventors: Jae Seung Lee, Daejeon (KR); Mln Ho Cheong, Daejeon (KR); Hyoung Jin Kwon, Daejeon (KR); Hee Jung Yu, Daejeon (KR); Jae Woo Park, Daejeon (KR); Sok Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/510,247

(22) Filed: Oct. 25, 2021

(65) Prior Publication Data
US 2022/0046537 A1      Feb. 10, 2022

Related U.S. Application Data

(63) Continuation of application No. 14/414,087, filed as application No. PCT/KR2013/006154 on Jul. 10, 2013, now Pat. No. 11,184,847.

(30) Foreign Application Priority Data

Jul. 10, 2012 (KR) .................. 10-2012-0075287
Oct. 2, 2012 (KR) .................. 10-2012-0109698
Jul. 10, 2013 (KR) .................. 10-2013-0080846

(51) Int. Cl.
H04W 52/02      (2009.01)
H04L 5/00      (2006.01)
(Continued)

(52) U.S. Cl.
CPC ........ *H04W 52/0216* (2013.01); *H04L 5/0055* (2013.01); *H04W 74/002* (2013.01); *H04W 84/12* (2013.01); *Y02D 30/70* (2020.08)

(58) Field of Classification Search
CPC ............. H04W 52/02; H04W 52/0206; H04W 52/0216; H04W 74/002; H04W 84/12; H04W 84/02; H04L 5/0055
(Continued)

(56) References Cited

U.S. PATENT DOCUMENTS

2007/0086370 A1    4/2007  Jang et al.
2009/0163211 A1*   6/2009  Kitazoe ............. H04W 74/0866
                                                   455/436
(Continued)

FOREIGN PATENT DOCUMENTS

EP    2141950 A1    1/2010
EP    2249613 A1    11/2010
(Continued)

OTHER PUBLICATIONS

Park, et al., "Uplink Channel Access", May 14, 2012, Intel Corp., IEEE 802.11-12/0606r1.
(Continued)

*Primary Examiner* — Kwang B Yao
*Assistant Examiner* — Syed M Bokhari

(57) ABSTRACT

A method and an apparatus for allocating a flexible transmission slot in a wireless local area network (LAN) system are disclosed. A flexible transmission slot allocation method of an access point (AP) in a wireless local area network (WLAN) system according to an exemplary embodiment
(Continued)

includes transmitting a beacon including a traffic indication map (TIM) bit to a station, receiving a power save poll (PS-Poll) from the station in a slot implicitly allocated by the TIM bit, and transmitting an acknowledgement (ACK) including transmission slot allocation information on downlink data to the station.

8 Claims, 6 Drawing Sheets

(51) Int. Cl.
  *H04W 74/00* (2009.01)
  *H04W 84/12* (2009.01)
(58) Field of Classification Search
  USPC .......................................................... 370/311
  See application file for complete search history.

(56) References Cited

U.S. PATENT DOCUMENTS

| | | |
|---|---|---|
| 2009/0238163 A1 | 9/2009 | Zhang et al. |
| 2010/0309831 A1 | 12/2010 | Yeh et al. |
| 2011/0158159 A1* | 6/2011 | Gong .................... H04L 1/1671 370/328 |
| 2011/0159908 A1 | 6/2011 | Terry et al. |
| 2012/0113904 A1* | 5/2012 | Anderson ............. H04W 76/28 370/329 |

FOREIGN PATENT DOCUMENTS

| | | |
|---|---|---|
| KR | 1020100050729 A | 5/2010 |
| WO | WO2008000915 A1 | 1/2008 |

OTHER PUBLICATIONS

Junkeun Song et al., "A Dynamic GTS Allocation Algorithm in IEEE 802.15.4 for QoS guaranteed Real-time Applications," IEEE International Symposium on Consumer Electronics, Jun. 20-23, 2007, pp. 1-6, IEEE.

International Search Report for PCT/KR2013/006154, dated Oct. 24, 2013.

* cited by examiner

METHOD AND APPARATUS FOR ALLOCATING FLEXIBLE TRANSMISSION SLOT IN WIRELESS LAN SYSTEM

CROSS-REFERENCE TO RELATED APPLICATIONS

The present application is a continuation of and claims priority to U.S. application Ser. No. 14/414,087, filed Jan. 9, 2015, which is a National Phase of International Application No. PCT/KR2013/006154, which claims priority to Korean Application Nos. 10-2013-0080846, filed Jul. 10, 2013, 10-2012-0109698, filed Oct. 2, 2012, 10-2012-0075287, filed Jul. 10, 2012, the contents of which are incorporated herein by reference in their entirety.

TECHNICAL FIELD

The present invention relates to a method and an apparatus for allocating a flexible transmission slot in a wireless local area network (LAN) system.

BACKGROUND ART

Wireless local area network (LAN) technology is advancing in three directions.

First, a 60-GHz band and a 5-GHz band are used in a wireless LAN in order to enhance a transfer rate. Second, a frequency band of less than 1 GHz is used for a wideband wireless LAN uses to expand a coverage thereof as compared with conventional wireless LAN technology. Third, a technique of reducing a link setup time of a WLAN system is adopted. A wideband wireless LAN is required to accommodate a remarkably larger number of stations (STAs) than an established wireless LAN.

A slot-based channel access mode may be used in a wireless LAN system. To make the slot-based channel access mode available, transmission slot allocation is needed for STAs.

In allocation of transmission slots, variable slots may be allocated for STAs within each restricted access window (RAW) to efficiently manage slots. However, amount of transmission information for transmitting slot allocation information may increase too much in each RAW For instance, since information on the RAW is included in a short beacon in transmission, the beacon becomes too large.

Further, when the transmission slot allocation information is transmitted in a separate frame, instead of the beacon, overhead of transmitting the frame occurs. Also, an STA operating in power sleep mode may have overhead of waking up to receive the frame.

When fixed transmission slots are allocated for STAs to reduce the slot allocation information in the RAW, signaling may become simple but slot management lacks flexibility.

DISCLOSURE OF INVENTION

Technical Goals

To overcome problems of the conventional technology, an aspect of the present invention is to provide a method and an apparatus for preventing waste of slot time and efficiently managing transmission slots by reducing overhead in transmission slot allocation and enabling flexible slot allocation.

Further, an aspect of the present invention is to provide a method and an apparatus for allocating temporary slots when transmission slots are insufficient for downlink and uplink transmission in a wireless LAN system.

Technical Solutions

A flexible transmission slot allocation method of an access point (AP) in a wireless local area network (LAN) system according to an exemplary embodiment includes transmitting a beacon including a traffic indication map (TIM) bit to a station, receiving a power save poll (PS-Poll) from the station in a slot implicitly allocated by the TIM bit, and transmitting an acknowledgement (ACK) including transmission slot allocation information on downlink data to the station.

A flexible transmission slot allocation method of a station in a wireless LAN system according to an exemplary embodiment includes receiving a beacon including a TIM bit from an AP, transmitting a PS-Poll to the AP in a slot implicitly allocated by the TIM bit, and receiving an ACK including transmission slot allocation information on downlink data from the AP.

A flexible transmission slot allocation method of a station in a wireless LAN system according to another exemplary embodiment includes verifying information on a restricted access window (RAW) included in a beacon or information on a slot regularly allocated at association, transmitting uplink data to an AP in an uplink slot, and receiving an ACK from the AP, wherein the uplink slot includes a fixed size of slot duration.

A flexible transmission slot allocation method of an AP in a wireless LAN system according to another exemplary embodiment includes transmitting a beacon including information on an RAW to a station, receiving uplink data in an uplink slot allocated to the station based on the information on the RAW or regularly allocated to the station at association, and transmitting an ACK with respect to the uplink data to the station, wherein the uplink slot includes a fixed size of slot duration.

An AP of a wireless LAN system according to an exemplary embodiment includes a transmission unit to transmit a beacon including a TIM bit to a station, a reception unit to receive a PS-Poll from the station in a slot implicitly allocated by the TIM bit, and a controller to control the transmission unit to transmit an ACK including transmission slot allocation information on downlink data to the station and to control slot allocation.

An AP of a wireless LAN system according to another exemplary embodiment includes a transmission unit to transmit a beacon including information on an RAW to a station, a reception unit to receive uplink data in an uplink slot allocated to the station based on the information on the RAW or regularly allocated to the station at association, and a controller to control the transmission unit to transmit an ACK with respect to the uplink data to the station and to control slot allocation, wherein the uplink slot includes a fixed size of slot duration.

A station of a wireless LAN system according to an exemplary embodiment includes a reception unit to receive a beacon including a TIM bit from an AP and to receive an ACK including transmission slot allocation information on downlink data from the AP, a transmission unit to transmit a PS-Poll to the AP in a slot implicitly allocated by the TIM bit, and a controller to control a sleep mode and a wakeup mode based on slot allocation.

A station of a wireless LAN system according to another exemplary embodiment includes a transmission unit to transmit uplink data to an AP in an uplink slot, a reception unit to receive an ACK from the AP, and a controller to control a sleep mode and a wakeup mode based on information on an RAW included in a beacon or information on a slot regularly allocated at association, wherein the uplink slot includes a fixed size of slot duration.

Effects of Invention

According to exemplary embodiments, overhead in transmission slot allocation may be reduced and flexible slot allocation is enabled, thereby preventing waste of slot time and efficiently managing transmission slots.

According to exemplary embodiments, waste of extra slot time may be avoided and time to wait for additional transmission of remaining data when transmission is not completed within a slot allocated to an STA may be reduced.

Further, slot allocation information included in a beacon in transmission may be minimized and extra slots may be allowed for use under control of the AP other than basically allocated slots. Accordingly, the extra slots may be optimally utilized and the STA does not need to wait for a next regular slot allocated to the STA to transmit the remaining data, thereby improving efficiency in use of transmission slots.

BEST MODE FOR CARRYING OUT THE INVENTION

Hereinafter, exemplary embodiments of the present invention are described in detail with reference to the accompanying drawings.

To use a slot-based channel access mode in a wireless local area network (LAN) system, transmission slot allocation is needed for stations.

Flexible transmission slot allocation disclosed in the specification may have six features as follows.

1. Stations (STAs) use regular slots initially allocated, and are temporarily allocated additional slots upon request to an access point (AP) if needed. Thus, flexible slot allocation may be managed. Here, the STAs may notify the AP of information on an uplink data size so as to help slot allocation and transmission scheduling of the AP.

2. In one restricted access window (RAW), slot duration has a fixed size. Thus, slot allocation information included in the RAW may be minimized.

When slot durations are different within one RAW, start time and duration information for each slot duration are added, thus increasing slot allocation information. Here, when slot duration is insufficient, temporary slot allocation may be performed.

3. In downlink transmission, a slot for transmitting a power save poll (PS-Poll) is implicitly allocated according to bit order of a traffic indication map (TIM) of a beacon. When the AP transmits an ACK with respect to the PS poll to the STAs, transmission slot allocation information on downlink data is included an acknowledgement (ACK) message.

4, In uplink transmission, an initial regular slot is allocated at association, and the STAs request allocation of temporary and additional slots to the AP in addition to the allocated regular slot and are allocated temporary slots.

5. Even after association between the AP and the STAs, an operation mode of the STAs may be changed. Here, a change of the operation mode of the STAs may be performed using an operating mode change request and an operating mode change response. Further, the change of the operation mode may include an association identification (AID) change, an STA group change and a change of a sector that an STA belongs to.

6. Since slot allocation information on each STA is not necessarily indicated in an RAW information element, slot allocation information may be minimized. Here, the AP may notify an STA whether to allow additional slots in the RAW.

Figure 1:
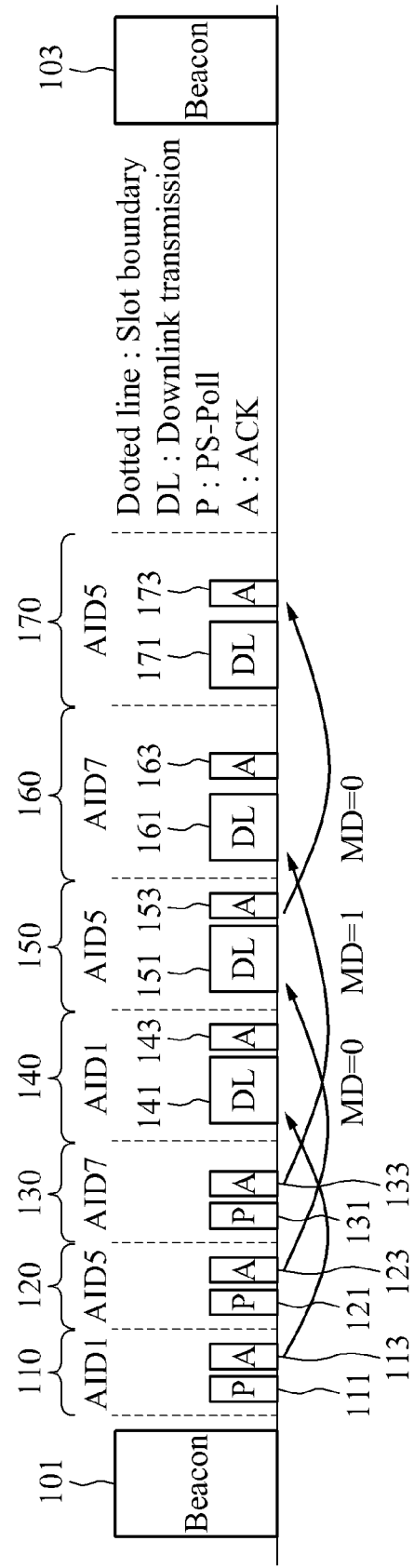
FIG. 1 illustrates flexible transmission slot allocation in downlink transmission in a wireless local area network (LAN) according to an exemplary embodiment.

FIG. 1 illustrates flexible transmission slot allocation in downlink transmission in a wireless LAN according to an exemplary embodiment.

Referring to FIG. 1, a dotted line denotes a slot boundary, DL denotes downlink transmission, P denotes a PS-Poll transmitted by an STA to an AP, and A denotes an ACK frame.

Beacons 101 and 103 include a TIM bit. For example, an STA with the TIM bit set to 1 is implicitly allocated a PS-Poll transmission slot. Sequence of TIM bits may be set in the same order of AIDs allocated to STAs.

First, an STA verifies a TIM bit included in a beacon for an STA group that the STA belongs to. The STA transmits a PS-Poll according to sequence of TIM bit setting. Thus, transmission of additional information on transmission slot allocation is not needed.

The AP may indicate in the TIM bit that there is downlink data. For example, when the TIM bit is set to 1 for AIDs of 1, 5 and 7, STAs having the AIDs of 1, 5 and 7 may recognize that a slot for transmitting the PS-Poll is implicitly allocated.

For convenience of description, a terminal having an AID of 1 is referred to as AID1, a terminal having an AID of 5 as AID5, and a terminal having an AID of 7 as AID7.

Referring to FIG. 1, AID1 transmits a PS-Poll 111 and receives an ACK 113 in a first slot boundary 110. Here, AID1 may recognize which slot AID1 is allowed to use to transmit the PS-Poll based on the set TIM bit.

STAs, that is, AID1, AID5 and AID7, may identify RAW start time and slot duration and determine an accurate time to transmit the PS-Poll by referring to RAW information included in the beacon.

Like AID1, AID5 transmits a PS-Poll 121 and receives an ACK 123 in a second slot boundary 120. Further, AID7 transmits a PS-Poll 131 and receives an ACK 133 in a third slot boundary 130.

When there is currently pending uplink data, the STAs AID1, AID5 and AID7 may include information on a size of the uplink data in the PS-Poll. The AP may allocate slot duration of a next uplink RAW and slots for the STAs based on the information on the size of the uplink data.

Here, since slot duration in one RAW has the same fixed size, information on slot start time and slot duration by STA may not need to be indicated separately.

In FIG. 1, the ACK frames 113, 123 and 133 with respect to the PS-Poll include downlink slot allocation information on AID1, AID5 and AID7. The AP already recognizes buffered data sizes for the respective STAs. Thus, the AP may insert slot allocation information, such as a downlink slot number, into the ACK frames.

In slot allocation, the AP may allow only a single slot to be allocated for one STA.

For example, the ACK frames may include a slot number only. Here, a normal ACK and a short ACK having a smaller frame size than the normal ACK may be used.

When the slot number is transmitted through the short ACK, a limited number of slot numbers may be expressed. When a total number of slots is greater than a reference level in one RAW, slot numbers may be transmitted using the normal ACK.

The AP may allocate a plurality of successive slots to one STA.

Here, the ACK frames may include not only slot numbers but a slot count. The AP may allocate a plurality of slots using the slot count.

For example, when an ACK frame is indicated with "3, 2," slots 3 and 4 are allocated. That is, "3, 2" indicated in the ACK frame may be interpreted as allocation of two successive slots from the slot 3.

When the AP and the STAs agree to use a downlink RAW for transmission of buffered data immediately after the PS-Poll is transmitted, the slot numbers or the slot numbers and slot count may be transmitted only.

However, when the downlink RAW is not used immediately after the PS-Poll is transmitted, not only the slot numbers or the slot numbers and slot counter but also a downlink RAW number to use or RAW group information may be transmitted.

The STA may enter a sleep mode after receiving the ACK with respect to the PS-Poll. The STA may wake up at a start point of an allocated slot and receive downlink data.

Referring to FIG. 1, AID1 may receive downlink data in a downlink data transmission section 141 of a fourth slot boundary 140 and transmit an ACK 143 to the AP.

AID5 may receive downlink data in a downlink data transmission section 151 of a fifth slot boundary 150 and transmit an ACK 153 to the AP.

AID7 may receive downlink data in a downlink data transmission section 161 of a fourth slot boundary 160 and transmit an ACK 163 to the AP.

The AP may allocate an additional slot for downlink data transmission.

The AP may indicate in the downlink data that there is additional downlink data. For example, the AP may include a "More data (MD) bit" in the downlink data and set the More data bit to 0 or 1. Here, a More data bit of 1 indicates that there is more data to transmit.

In FIG. 1, AID1 and AID7 receive data with an MD bit set to 0, while AID5 has an MD bit set to 1.

Here, AID1 and AID7 determine that there is no more data to receive based on the MD bit, and may enter the sleep mode immediately after transmitting the ACKs 143 and 164. AID5 needs to additionally receive buffered data.

AID5 may receive additional downlink data in a downlink data transmission section 171 of a seventh slot boundary 170 and transmit an ACK 173 to the AP.

When the MD bit is 1 and it is impossible to transmit remaining data to the STA within a currently allocated slot, the AP may allocate an extra slot to the STA. For example, AID5 has an MD bit of 1 and cannot receive remaining data within a currently allocated slot in the fifth slot boundary.

Here, when there are remaining slots and thus allocation of an additional slot is possible, the AP may notify the STA of information on a slot to be additionally allocated. For example, the information on the slot to be additionally allocated may include at least one of an additional RAW number, an RAW group and a slot number. Here, when an extra slot in the same RAW is additionally allocated, the AP may transmit only a number of the slot to be additionally allocated. The AP may aggregate the information on the slot to be additionally allocated with a data frame transmitted to the STA in transmission. For example, the slot allocation information may be included in an MAC header or SIG field of the data frame sent by the AP and transmitted.

For example, AID5 includes information on an additional slot allocated by the AP in a data frame received within the fifth slot boundary.

The STA may notify the AP whether to receive additional data in the slot additionally allocated by the AP or in a next delivery traffic indication map (DTIM) when transmitting the ACK frame.

When the STA does not receive the additional data in the additionally allocated slot, the STA may wake up, transmit the PS-Poll and receive the additional data in the next DTIM.

In FIG. 1, the downlink transmission section 171 in the seventh slot boundary 170 is a temporary slot additionally allocated.

When the MD bit is 1, it is impossible to transmit remaining data within a currently allocated slot to the STA and there is no extra slot, the AP may transmit information reporting that no more data can be transmitted in the allocated slot to be aggregated with the data frame. Here, the STA enters the sleep mode, and then wakes up, transmits the PS-Poll to the AP and receives data in a next DTIM that the STA belongs to.

Figure 2:
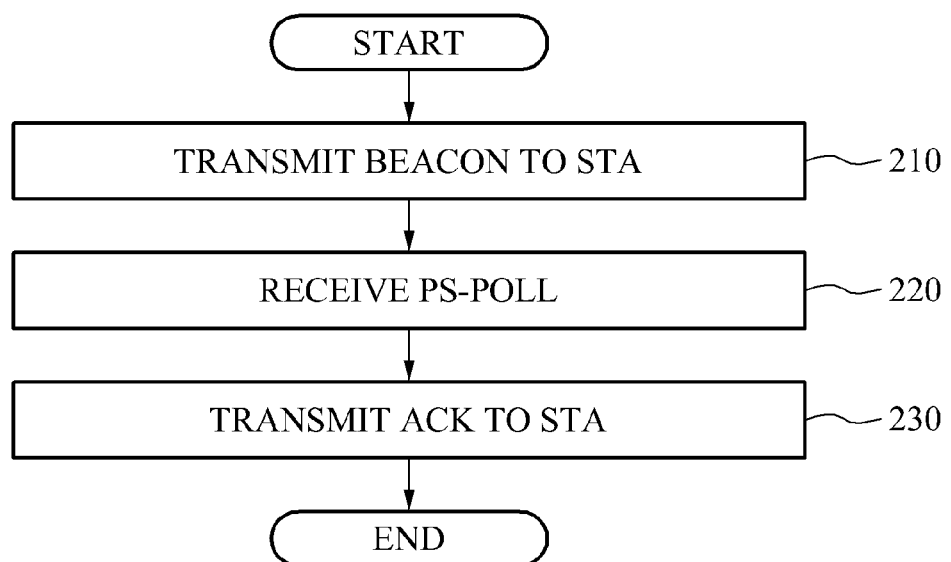
FIG. 2 is a flowchart illustrating a flexible transmission slot allocation method of an AP in the wireless LAN system according to an exemplary embodiment.

FIG. 2 is a flowchart illustrating a flexible transmission slot allocation method of an AP in the wireless LAN system according to an exemplary embodiment.

Referring to FIG. 2, the AP transmits a beacon including a TIM bit to an STA in operation 210.

Here, the TIM bit may indicate transmission order of PS-Polls and information on existence of downlink data. Further, the beacon includes information on a RAW, the information on the RAW includes start time of the RAW and slot duration, and the slot duration has a fixed size.

Here, before operation 210, initial slot allocation may be carried out. The AP may receive an association request from the STA and transmit an association response including an AID to the STA.

Here, the STA may transmit information relevant to STA grouping, for example, a device type, power save parameters including a listen interval, a maximum idle period, a wireless network management (WNM) sleep interval and a wakeup interval, a TIM/non-TIM operation mode, a traffic type, a service type and a sector that the STA belongs to, to the AP via the association request at association with the AP. The AP allocates an AID to the STA and groups the STA into a particular group based on the information.

The AP may transmit allowed power save parameters including an listen interval, a maximum idle period, a WNM-sleep interval and a wakeup interval, the AID allocated to the STA, the STA group and an initial uplink slot number to the STA in the association response.

When the STA group is implicitly allocated based on the AID allocated by the AP and uplink slot allocation information is transmitted through the beacon, the STA group and the initial uplink slot number may not need transmitting in the association response.

The STA group and the slot number may be identified only with the AID. When the uplink slot allocation information is not transmitted through the beacon, an initial uplink slot may be allocated at association.

Generally, an STA is allocated one AID, and the AP may allocate one STA for a plurality of RAWs. For example, the AP may allocate the STA for a plurality of RAWs, such as an uplink RAW and an up/downlink RAW.

When the STA supports two or more device types, the STA may be allocated AIDs for the respective device types, belong to separate STA groups by AIDs and be allocated for separate RAWs by AIDs.

Further, when the STA switches between TIM/non-TIM modes, the STA may be allocated an AID for a TIM operation and a separate AID for a non-TIM operation and allocated separate STA groups and separate RAWs.

In downlink transmission, a slot used for transmitting the PS-Poll is implicitly allocated according to TIM bit sequence of the beacon, and downlink data transmission slot allocation information may be transmitted in an ACK to the STA when the AP transmits the ACK with respect to the PS-Poll.

Meanwhile, when AID reallocation is carried out, the AP may reallocate a slot within the RAW allowed for the STA group that the STA belongs to.

The STA may request a change of an operation mode of the STA, such as an AID change, an STA group change and a sector change, using an operating mode change request and response even after association.

The AP may control the change of the operation mode of the STA. If necessary, the AP may change the operation mode without a request from the STA. For example, the AP may notify the STA of an AID change, an STA group change, a change of sector allocation for the STA and a slot allocation change.

When an operating mode change is requested, an AID may be reallocated. Here, the STA group may be changed, and the AP reallocates a slot within the RAW allowed for the STA group.

In operation 220, the AP receives a PS-Poll from the STA in a slot implicitly allocated by the TIM bit. For example, the AP may receive the PS-Poll in the slot 111 transmitted from AID1 of FIG. 1.

In operation 230, the AP transmits an ACK including transmission slot allocation information on downlink data to the STA.

As shown in FIG. 1, the AP may transmit the downlink data to the STA in the allocated downlink data transmission slot after operation 230. Here, the downlink data may include temporary slot allocation information on additional downlink data.

Figure 3:
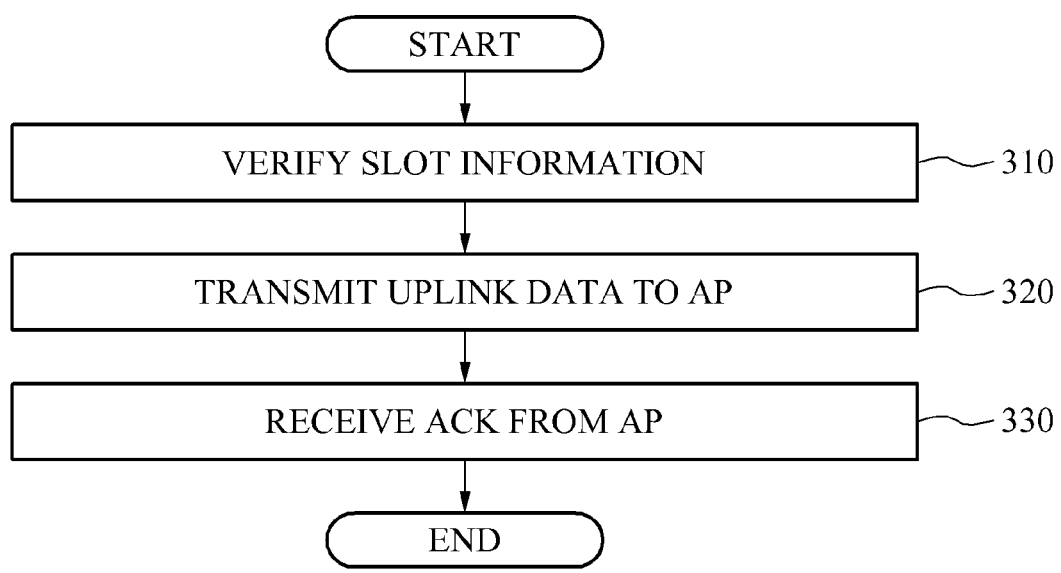
FIG. 3 is a flowchart illustrating a flexible transmission slot allocation method of an STA in the wireless LAN system according to an exemplary embodiment.

FIG. 3 is a flowchart illustrating a flexible transmission slot allocation method of an STA in the wireless LAN system according to an exemplary embodiment.

Referring to FIG. 3, the STA receives a beacon including a TIM bit from the AP in operation 310.

The STA may determine the sleep mode or a wakeup mode based on transmission order of PS-Polls and information about existence of downlink data.

Here, a PS-Poll includes information on a size of pending uplink data of the STA, and the STA may be allocated a slot of a next uplink RAW based on the size.

In operation 320, the STA transmits a PS-Poll to the AP in a slot implicitly allocated by the TIM bit.

In operation 330, the STA receives an ACK including transmission slot allocation information on downlink data from the AP.

After operation 330, the STA may receive 'downlink data including additionally allocated slot information' in the allocated downlink data transmission slot and transmit an ACK with respect to the downlink data to the AP. Here, the ACK may include information on whether to use the additionally allocated slot or to wake up in a next DTIM.

Figure 4:
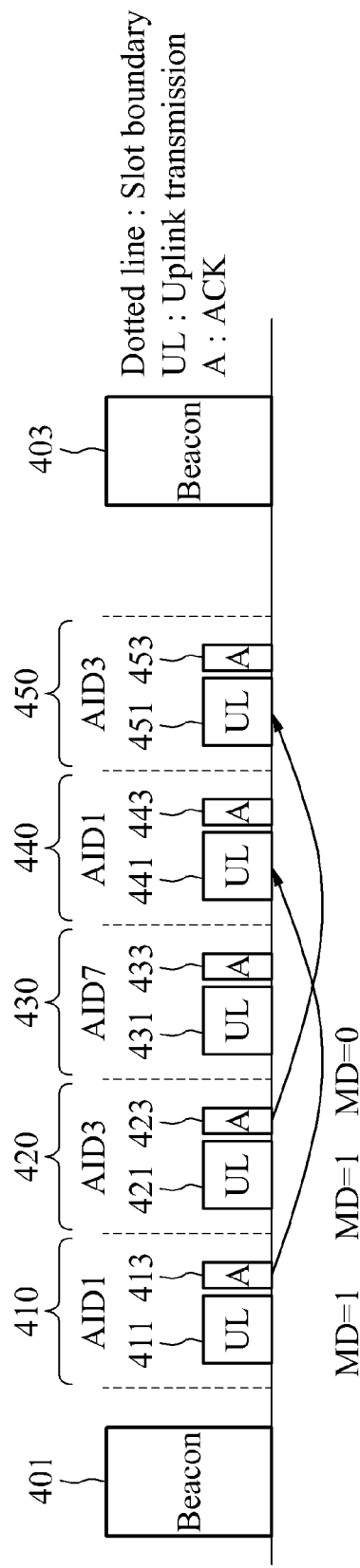
FIG. 4 illustrates flexible transmission slot allocation in uplink transmission in the wireless LAN system according to an exemplary embodiment.

FIG. 4 illustrates flexible transmission slot allocation in uplink transmission in the wireless LAN system according to an exemplary embodiment.

Uplink transmission may includes the following processes (a) to (c).

(a) The AP transmits a beacon including information on an RAW to an STA. The STA verifies the information on the RAW included in the beacons 401 and 403 or information on a slot regularly allocated at association.

(b) The STA transmits uplink data to the AP in an uplink slot. The AP receives the uplink data in the uplink slot allocated to the STA based on the information on the RAW or regularly allocated to the STA at association.

The uplink data may include information on whether there is extra data in addition to the data transmitted through the uplink slot, for example, an MD bit.

(c) The AP transmits an ACK with respect to the uplink data to the STA. The STA receives the ACK from the AP. Here, slot duration of the uplink slot has a fixed size. Here, the ACK includes information on additional slot allocation for the additional data, and the STA may determine the sleep mode and the wakeup mode based on the information on the additional slot allocation.

Referring to FIG. 4, a dotted line denotes a slot boundary, UL denotes uplink transmission, and A denotes an ACK frame.

For convenience of description, a terminal having an AID of 1 is referred to as AID1, a terminal having an AID of 3 as AID3, and a terminal having an AID of 7 as AID7.

The information on the RAW may be included in GrPS of the beacon 401. The STA may identify which slot the STA is allocated through the information on the RAW. When an allocated fixed slot is used in initial slot allocation, the information on the RAW may not be needed.

When one STA is allocated only a single slot within one RAW, slot duration is the same, and thus the STA may not receive additional slot allocation map information.

When one STA is allocated a plurality of successive slots within one RAW, the information on the RAW may include not only slot numbers but a slot count.

For example, when the information on the RAW is indicated with "4, 2," slots 4 and 5 are allocated. That is, "4, 2" indicated in the RAW may be interpreted as allocation of two successive slots from the slot 4.

The STA may wake up at start time of the allocated slot and transmit the uplink data.

Referring to FIG. 4, AID1 may wake up and transmit uplink data in an uplink data transmission section 411 of a slot boundary 410 and receive an ACK 413.

AID3 may transmit uplink data in an uplink data transmission section 421 of a slot boundary 420 and receive an ACK 423.

AID7 may transmit uplink data in an uplink data transmission section 431 of a slot boundary 430 and receive an ACK 433.

To further provide slot allocation flexibility, an additional or temporary slot may be allocated when the regularly allocated slot is insufficient for uplink data transmission.

The STA may indicate in an MAC header that there is more data to transmit when it is impossible to completely transmit pending data within the regularly allocated slot in uplink data transmission.

For example, in FIG. 4, AID1 and AID3 may set the More Data bit to 1 to notify the AP that there is additional data to transmit.

The STA may set the MD bit to 1 only when it is impossible to completely transmit pending data within the regularly allocated slot, or set the MD bit to 1 regardless of remaining slot time when there is pending data to uplink-transmit.

When the MD bit is set to 1 only when it is impossible to completely transmit pending data within the regularly allocated slot, the STA may notify the AP that it is impossible to complete transmission of pending data within the regularly allocated slot.

When the MD bit is to 1 regardless of remaining slot time when there is pending data to uplink-transmit, the STA may need to use additional information to notify the AP that it is impossible to complete transmission of pending data within the regularly allocated slot. For example, the STA may transmit 1-bit "additional slot necessary" along with the MD bit set to 1.

Even though the STA does not completely transmit the data, when the STA wishes to wake up and transmit remaining data in a next regular slot allocated to the STA without allocation of additional or temporary slots, the STA may transmit an additional slot necessary bit set to 0 and enter the sleep mode after receiving an ACK from the AP.

The STA may notify the AP of a remaining uplink data size along with more data information in uplink data transmission. For example, the STA may notify the AP of information on the uplink data size by aggregating information on the remaining uplink data size with the MAC header or using an SIG field. The AP may use the information on the uplink data size for additional temporary slot allocation.

When the AP is able to temporarily allocate an extra uplink slot to the STA, the AP may allocate the extra slot and notify the STA of information on the allocated slot to be included in an ACK. Here, the information on the allocated slot may include an RAW number, RAW group information and a slot number.

In FIG. 4, AID1 and AID3 transmit data with the MD bit set to 1, while AID7 has the MD bit set to 0. Here, AID7 may enter the sleep mode immediately after receiving the ACK 433.

AID1 may transmit additional data in an uplink data transmission section 441 of a slot boundary 440 and receive an ACK 443 from the AP. Further, AID3 may transmit additional data in an uplink data transmission section 451 of a slot boundary 450 and receive an ACK 453.

Here, only when additional temporary RAW allocation is allowed for the RAW, a slot of the RAW may be additionally allocated. Allowance of temporary RAW allocation may be indicated in GrPS of the RAW.

When an extra slot in the same RAW is allocated, the AP may transmit a slot number only. The additional slot allocation information may be aggregated with an ACK frame transmitted by the AP to the STA and transmitted. For example, the slot allocation information may be included in the MAC Header or SIG field. When the slot allocation information is short, the slot allocation information may be included in a short ACK and transmitted. When the slot allocation information is longer than a reference level, the slot allocation information may be included in a normal ACK and transmitted.

When additional slot allocation is not allowed or there is no extra slot, the STA transmits the remaining uplink data in a next regular slot allocated to the STA.

When the AP is unable to allocate an additional slot to the STA, the AP may transmit information reporting that no more data can be transmitted in the allocated slot to be aggregated with the ACK. Here, the STA enters the sleep mode, and then wakes up and transmits the remaining uplink data in the next regular slot allocated to the STA.

Figure 5:
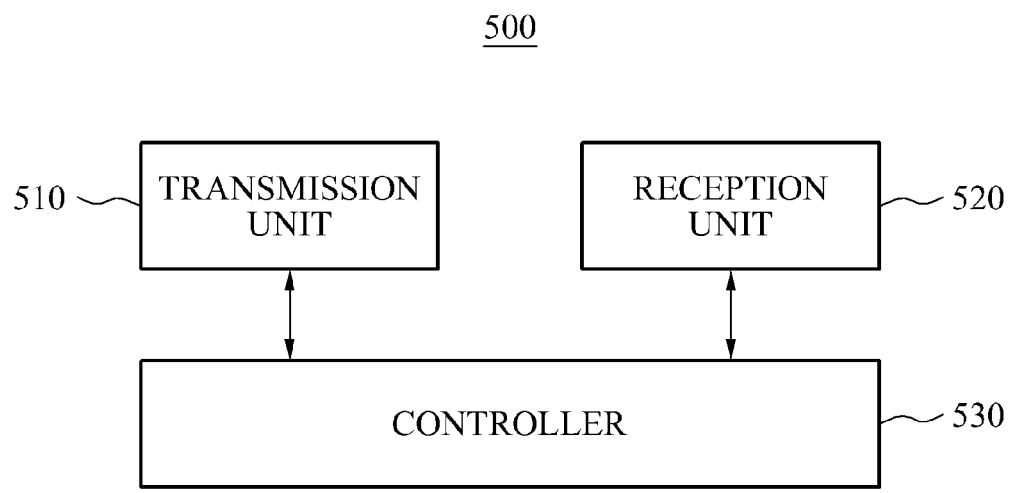
FIG. 5 illustrates a configuration of an access point (AP) in the wireless LAN system according to an exemplary embodiment.

FIG. 5 illustrates a configuration of an AP in the wireless LAN system according to an exemplary embodiment.

Referring to FIG. 5, the AP 500 includes a transmission unit 510, a reception unit 520 and a controller 530.

The transmission unit 510 transmits a beacon including a TIM bit to an STA. Further, the transmission unit 510 transmits a beacon including information on an RAW to the STA.

The reception unit 520 receives a PS-Poll from the STA in a slot implicitly allocated by the TIM bit. Further, reception unit 520 receives uplink data in an uplink slot allocated to the STA based on the information on the RAW or regularly allocated to the STA at association.

The controller 530 may control the transmission unit to transmit an ACK including transmission slot allocation information on downlink data to the STA and control slot allocation. Further, the controller 530 may control the transmission unit to transmit an ACK with respect to uplink data to the STA and control slot allocation.

Figure 6:
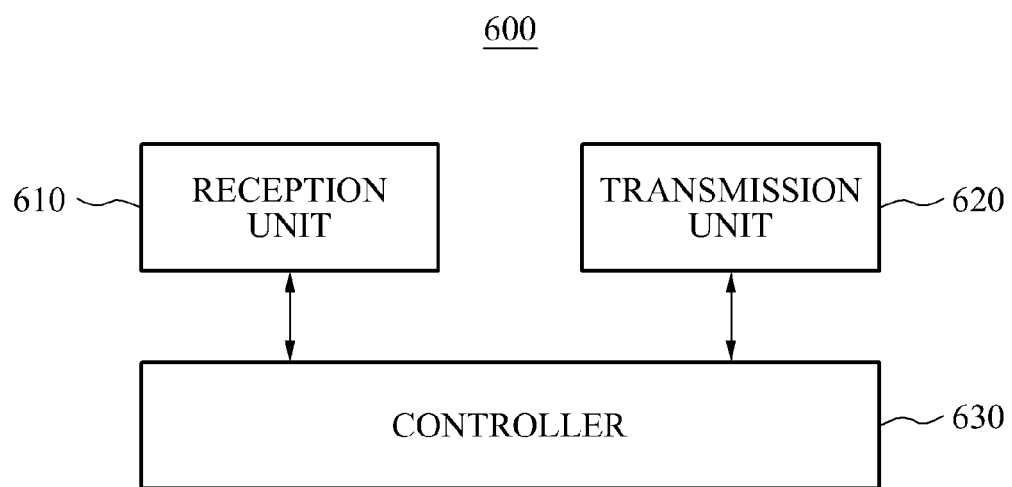
FIG. 6 illustrates a configuration of a station (STA) in the wireless LAN system according to an exemplary embodiment.

FIG. 6 illustrates a configuration of an STA in the wireless LAN system according to an exemplary embodiment.

Referring to FIG. 6, the STA 600 includes a reception unit 610, a transmission unit 620 and a controller 630.

The reception unit 610 receives a beacon including a TIM bit from the AP and receives an ACK comprising transmission slot allocation information on downlink data from the AP.

Further, the reception unit 610 receives an ACK with respect to uplink data from the AP.

The transmission unit 620 transmits a PS-Poll to the AP in a slot implicitly allocated by the TIM bit. Also, the transmission unit 620 transmits the uplink data to the AP in an uplink slot.

The controller 630 controls the sleep mode and the wakeup mode of the STA 600 based on slot allocation. Further, the controller 630 controls the sleep mode and the wakeup mode of the STA 600 based on information on an RAW included in the beacon or information on a slot regularly allocated at association.

The methods according to the exemplary embodiments may be recorded in computer-readable media as program instructions to be implemented by various computers. The media may also include, alone or in combination, the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy discs and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like.

Examples of program instructions include both machine code, such as produced by a compiler, and higher level code that may be executed by a computer using an interpreter. The described hardware devices may be configured to act as one or more software modules in order to perform the operations of the above-described exemplary embodiments, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Thus, other implementations, alternative embodiments and equivalents to the claimed subject matter are construed as being within the appended claims.

The invention claimed is:

1. A method of uplink transmission by a station (STA) in a wireless local area network, the method comprising:
receiving, from an access point (AP), an uplink soliciting frame including information on a plurality of an association identifier (AID) and information on resource allocation based on the AID, wherein each STA has its own AID and information on resource allocation includes information of each STA's resource allocation based on AID;
wherein the uplink soliciting frame is transmitted by the AP without a request from the STA, and the uplink soliciting frame solicits the STA to report an amount of uplink data buffered at the STA, wherein the information indicating an amount of uplink data buffered at the STA is included in medium access control (MAC) header of the frame transmitted to the AP;
in response to the uplink soliciting frame, transmitting, through an allocated resource based on the resource allocation included in the uplink soliciting frame, a first uplink transmission frame including the information indicating an amount of uplink data buffered at the STA when the transmission for the remaining data of the STA is impossible based on the allocated resource;
receiving a data soliciting frame including information on the data transmission resource for the next transmission of the STA based on the information indicating an amount of uplink data buffered at the STA; and
transmitting, using the data transmission resource indicated by the data soliciting frame for the next transmission of the STA, a second uplink transmission frame including data to the AP.

2. The method of claim 1,
wherein the first uplink transmission frame includes data and information indicating the amount of uplink data buffered at the STA based on the AID to assist the AP in allocating a data transmission resource for the next transmission of the STA.

3. A method of uplink reception by an access point (AP) in a wireless local area network, the method comprising:
transmitting, to a station (STA), an uplink soliciting frame including information on a plurality of an association identifier (AID) and information on resource allocation based on the AID, wherein each STA has its own AID and information on resource allocation includes information of each STA's resource allocation based on AID;
wherein the uplink soliciting frame is transmitted by the AP without a request from the STA and the uplink soliciting frame solicits the STA to report an amount of uplink data buffered at the STA, wherein the information indicating an amount of uplink data buffered at the STA is included in medium access control (MAC) header of the frame transmitted to the AP;
in response to the uplink soliciting frame, receiving, through an allocated resource based on the resource allocation included in the uplink soliciting frame, a first uplink transmission frame including the information indicating an amount of uplink data buffered at the STA when the transmission for the remaining data of the STA is impossible based on the allocated resource;
transmitting a data soliciting frame including information on the data transmission resource for the next transmission of the STA based on the information indicating an amount of uplink data buffered at the STA; and
receiving, using the data transmission resource indicated by the data soliciting frame for the next transmission of the STA, a second uplink transmission frame including data from the STA.

4. The method of claim 3,
wherein the first uplink transmission frame includes data and information indicating the amount of uplink data buffered at the STA based on the AID to assist the AP in allocating a data transmission resource for the next transmission of the STA.

5. An apparatus of a station (STA) performing uplink transmission in a wireless local area network, the apparatus comprising:
a receiver;
a transmitter; and
a controller,
wherein the controller is configured to:
receive, using the receiver, from an access point (AP), an uplink soliciting frame including information on a plurality of an association identifier (AID) and information on resource allocation based on the AID,
wherein each STA has its own AID and information on resource allocation includes information of each STA's resource allocation based on AID,
wherein the uplink soliciting frame is transmitted by the AP without a request from the STA, and the uplink soliciting frame solicits the STA to report an amount of uplink data buffered at the STA, wherein the information indicating an amount of uplink data buffered at the STA is included in medium access control (MAC) header of the frame transmitted to the AP,
in response to the uplink soliciting frame, transmit, using the transmitter, through an allocated resource based on the resource allocation included in the uplink soliciting frame, a first uplink transmission frame including the information indicating an amount of uplink data buffered at the STA when the transmission for the remaining data of the STA is impossible based on the allocated resource,
receive a data soliciting frame including information on the data transmission resource for the next transmission of the STA based on the information indicating an amount of uplink data buffered at the STA, and
transmit, using the data transmission resource for the of transmission from the STA, a second uplink transmission frame including data to the AP.

6. The method of claim 5,
wherein the first uplink transmission frame includes data and information indicating the amount of uplink data buffered at the STA based on the AID to assist the AP in allocating a data transmission resource for the next transmission of the STA.

7. An apparatus of an access point (AP) performing uplink reception in a wireless local area network, the apparatus comprising:
a receiver;
a transmitter; and
a controller,
wherein the controller is configured to:
transmit, using the transmitter, to a station (STA), an uplink soliciting frame including information on a plurality of an association identifier (AID) and information on resource allocation based on the AID,
wherein each STA has its own AID and information on resource allocation includes information of each STA's resource allocation based on AID,
wherein the uplink soliciting frame is transmitted by the AP without a request from the STA and the uplink soliciting frame solicits the STA to report an amount of uplink data buffered at the STA, wherein the information indicating an amount of uplink data buffered at the STA is included in medium access control (MAC) header of the frame transmitted to the AP,
in response to the uplink soliciting frame, receive, using the receiver, through an allocated resource based on the resource allocation included in the uplink soliciting frame, a first uplink transmission frame including the information indicating an amount of uplink data buffered at the STA when the transmission for the remaining data of the STA is impossible based on the allocated resource,
transmit a data soliciting frame including information on the data transmission resource for the next transmission of the STA based on the information indicating an amount of uplink data buffered at the STA, and
receive, using the data transmission resource for the next transmission of the STA, a second uplink transmission frame including data from the STA.

8. The method of claim 7,
wherein the first uplink transmission frame includes data and information indicating the amount of uplink data buffered at the STA based on the AID to assist the AP in allocating a data transmission resource for the next transmission of the STA.

* * * * *